(12) United States Patent
Ito

(10) Patent No.: US 7,688,413 B2
(45) Date of Patent: Mar. 30, 2010

(54) ACTIVE MATRIX LIQUID CRYSTAL DISPLAY DEVICE

(75) Inventor: Hideki Ito, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 490 days.

(21) Appl. No.: 11/378,293

(22) Filed: Mar. 20, 2006

(65) Prior Publication Data

US 2006/0215100 A1 Sep. 28, 2006

(30) Foreign Application Priority Data

Mar. 23, 2005 (JP) ............................. 2005-083051

(51) Int. Cl.
F02F 1/1343 (2006.01)
(52) U.S. Cl. ...................................... 349/141; 349/143
(58) Field of Classification Search ................. 349/141, 349/139, 155–156, 143
See application file for complete search history.

(56) References Cited

U.S. PATENT DOCUMENTS 6,577,374 B1 * 6/2003 Nakata et al. ............... 349/156
6,583,840 B1 * 6/2003 Inoue et al. ................. 349/141
7,385,661 B2 * 6/2008 Chae .......................... 349/141

FOREIGN PATENT DOCUMENTS

JP 7-191336 7/1995

* cited by examiner

Primary Examiner—Dung T. Nguyen
(74) Attorney, Agent, or Firm—McGinn IP Law Group, PLLC

(57) ABSTRACT

In a region where data wirings are formed on a TFT substrate, convex parts, each having a trapezoidal cross section or the like, are formed. A pixel electrode is formed on one of side faces of the convex part, and a common electrode is formed on the other side face. Furthermore, the pixel electrodes and the common electrodes are set to face each other between the convex parts adjacent to each other.

10 Claims, 5 Drawing Sheets

ACTIVE MATRIX LIQUID CRYSTAL DISPLAY DEVICE

BACKGROUND OF THE INVENTION

1. Field of the Invention

The present invention relates to an active matrix liquid crystal display device, and more particularly relates to an in-plane switching mode active matrix liquid crystal display device.

2. Description of the Related Art

In recent years, an active matrix liquid crystal display (LCD) device using a thin film transistor (TFT) as a switching element of a pixel has been widely used. Operation modes of the LCD device described above include: a twisted nematic (TN) mode of rotating liquid crystal molecules in a direction perpendicular to a glass substrate; and a lateral electric field mode of rotating liquid crystal molecules in a direction parallel to a glass substrate. The lateral electric field mode is also called an in-plane switching (IPS) mode.

As shown in FIG. 8 or FIG. 9, in an IPS mode LCD device, normally, pixel electrodes 51 and common electrodes 52 are alternately formed so as to be parallel to each other on a TFT substrate 50. Accordingly, electric fields 53 between both electrodes change an orientation of liquid crystal molecules to control an amount of transmitted light. As described above, in the IPS mode, the liquid crystal molecules are rotated in a plane parallel to the substrate surface. Thus, the IPS mode has viewing angle characteristics better than those of the TN mode. As to such an IPS mode LCD device, for example, Japanese Patent Laid-open No. Hei 7-191336 has been known.

However, in the IPS mode LCD device of the related art, in order to reduce a drive voltage, the pixel electrodes 51 and the common electrodes 52 are arranged in a comb-teeth pattern and the comb-teeth-shaped electrodes are formed in an aperture. If the pixel electrodes 51 or the common electrodes 52 are formed of conductive films which are not transparent or have low light transmittance, aperture ratio is inevitably lowered.

Moreover, since the comb-teeth-shaped electrodes are formed on approximately the same plane, as shown in FIG. 9, a vertical electric field perpendicular to substrates 50 and 60 is also generated, besides a lateral electric field parallel to the substrates 50 or 60, between the comb-teeth-shaped electrodes. Accordingly, a uniform lateral electric field cannot be formed in a liquid crystal layer 70. Thus, the viewing angle characteristics may be deteriorated.

Moreover, since the comb-teeth-shaped electrodes are formed in an aperture, difference in level is formed by the comb-teeth-shaped electrodes in the aperture. Accordingly, in a rubbing treatment for controlling an initial alignment orientation of the liquid crystal molecules, rubbing dust is produced by the difference in level. Thus, inferior display characteristics such as a point defect may be caused by the rubbing dust.

SUMMARY OF THE INVENTION

Therefore, an exemplary feature of the invention is to provide an IPS mode active matrix LCD device capable of improving aperture ratio and viewing angle characteristics and of suppressing occurrence of inferior display characteristics such as a point defect due to rubbing dust.

An IPS mode LCD device of the present invention includes a pair of substrates facing each other and a liquid crystal layer interposed between the pair of substrates. One of the pair of substrates includes: a plurality of gate wirings and a plurality of data wirings crossing each other, common electrode wirings disposed approximately parallel to the respective gate wirings; switching elements disposed in respective pixel regions surrounded by the gate wirings and the data wirings; and pixel electrodes connected to the switching elements. In the LCD device, liquid crystal molecules of the liquid crystal layer within the pixel region are rotated in a plane approximately parallel to the substrate by a voltage applied between a common electrode connected to one the common electrode wirings and the pixel electrode. On the one substrate, stripe-shaped convex parts are provided, which are formed so as to overlap at least a region where the data wirings are formed. The pixel electrode is formed in a region including at least a part of one of side walls of the convex part. Moreover, the common electrode is formed in a region including at least a part of the other side wall of the convex part.

Another IPS mode LCD device of the present invention includes a pair of substrates facing each other and a liquid crystal layer interposed between the pair of substrates. One of the pair of substrates includes: a plurality of gate wirings and a plurality of data wirings crossing each other, common electrode wirings disposed approximately parallel to the respective gate wirings; switching elements disposed in respective pixel regions surrounded by the gate wirings and the data wirings; and pixel electrodes connected to the switching elements. In the LCD device, liquid crystal molecules of the liquid crystal layer within the pixel region are rotated in a plane approximately parallel to the substrate by a voltage applied between a common electrode connected to one of the common electrode wirings and the pixel electrode. On the one substrate, lattice-shaped convex parts are provided, which are formed so as to overlap at least with regions where the data wirings, the gate wirings and the common electrode wirings are formed. The pixel electrode is formed in a region including at least a part of one of side walls of the convex part along the data wiring. Moreover, the common electrode is formed in a region including at least a part of the other side wall of the convex part.

It is preferable that the pixel electrode be formed of a first pixel electrode, which is formed in the same layer as the layer where the data wiring is formed, and a second pixel electrode, which is formed on the first pixel electrode with an insulating film interposed therebetween and is connected to the first pixel electrode through a contact hole. Moreover, it is preferable that the second pixel electrodes and the common electrodes be formed in the same layer.

Moreover, it is preferable that the data wiring is formed in an upper portion of the convex part, and the first and second pixel electrodes be formed in a region including at least a part of the one side wall of the convex part.

Moreover, it is preferable that the data wiring and the first pixel electrode be formed in a lower portion of the convex part, and the second pixel electrode be formed in a region including at least a part of the one side wall of the convex part.

Moreover, it is preferable that a cross section of the convex part in a direction perpendicular to an extending direction have a trapezoidal shape in which side walls on both sides are tilted at approximately the same angle relative to a plane of the substrate.

According to the IPS mode active matrix LCD device of the present invention, the following exemplary advantages are achieved.

A first advantage of the present invention is that it is possible to increase aperture ratio and to improve brightness and contrast compared with the IPS mode LCD device of the related art. The reason for the above is that, since the pixel electrodes and the common electrodes for generating a lateral electric field are formed on the both side walls of the convex part formed along the data wiring, effective areas of the pixel electrodes and the common electrodes can be increased. Thus, it is no longer required to form comb-teeth-shaped electrodes crossing an aperture of a pixel region. Specifically, the effective areas of the pixel electrodes and the common electrodes can be increased while suppressing an increase in an occupied area in a planar direction on the substrate.

Moreover, a second advantage of the present invention is that viewing angle characteristics can be improved compared with the IPS mode LCD device of the related art. The reason for the above is that, by forming the pixel electrodes and the common electrodes for generating the lateral electric field on the both side walls of the convex part, the pixel electrodes and the common electrodes can be allowed to face each other between the convex parts adjacent to each other. Thus, an electric field generated between the pixel electrodes and the common electrodes can be set uniform and approximately parallel to a substrate surface.

Moreover, a third advantage of the present invention is that inferior display characteristics such as a point defect can be suppressed. The reason for the above is that, since it is not required to form the comb-teeth-shaped electrodes crossing the aperture of the pixel region, the aperture can be flattened. Thus, rubbing dust is less likely to be produced in a rubbing treatment that is a process to allow liquid crystal molecules to have orientation.

BRIEF DESCRIPTION OF THE DRAWINGS

These and other objects and advantages and further description of the invention will be more apparent to those skilled in the art by reference to the description, taken in connection with the accompanying drawings, in which.

DETAILED DESCRIPTION OF THE PREFERRED EMBODIMENTS

According to an embodiment of the present invention, convex parts, each having a trapezoidal cross section or the like, are formed so as to overlap with at least a region where data wirings are formed on a TFT substrate included in an active matrix LCD device. A pixel electrode is formed in a region including at least a part of one of side walls of the convex part. Moreover, a common electrode is formed in a region including at least a part of the other side wall. Between the convex parts adjacent to each other, the pixel electrodes and the common electrodes are set to face each other. In the structure described above, since effective areas of the pixel electrodes and the common electrodes can be increased, it is no longer required to form comb-teeth-shaped electrodes crossing an aperture of a pixel region. Thus, aperture ratio can be increased compared with an IPS mode LCD device of the related art. Moreover, since the pixel electrodes and the common electrodes can be set to face each other, an electric field generated between the electrodes can be set uniform and approximately parallel to a substrate surface. Thus, viewing angle characteristics can be improved compared with the IPS mode LCD device of the related art. Furthermore, since it is not required to form the comb-teeth-shaped electrodes in the aperture, rubbing dust is less likely to be produced in the aperture. Thus, inferior display characteristics such as a point defect can be suppressed.

In order to give a more detailed description of the above embodiment of the present invention, an IPS mode active matrix LCD device according to a first exemplary embodiment of the present invention will be described with reference to FIGS. 1 to 5.

The active matrix LCD device of this embodiment includes: one substrate on which switching elements such as TFTs are formed; the other substrate on which color filters and the like are formed; and a liquid crystal layer interposed between the substrates. In the following description, the one substrate on which the switching elements such as the TFTs are formed is called a TFT substrate. Moreover, in the following description, the other substrate on which the color filters and the like are formed is called an opposing substrate.

Figure 1:
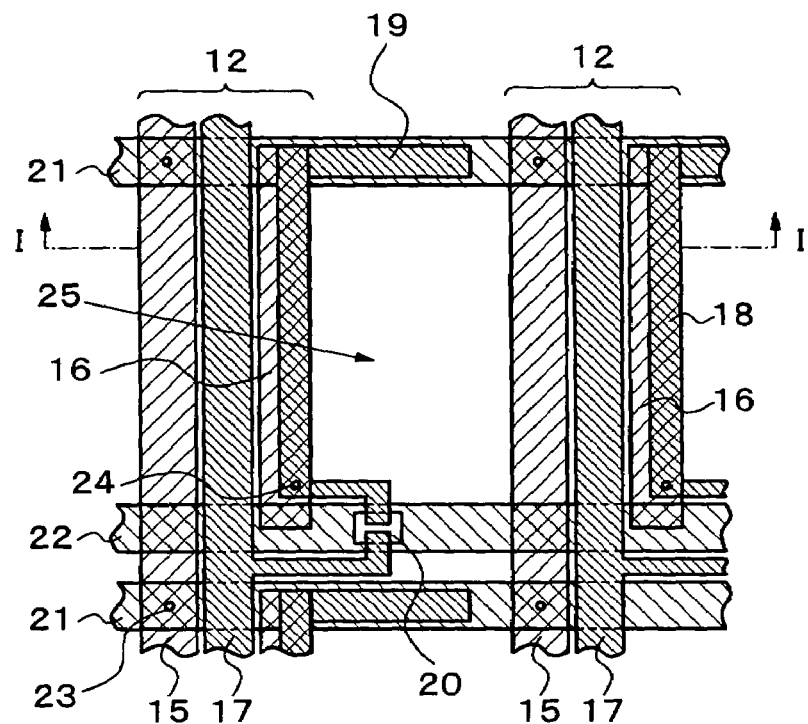
FIG. 1 is a plan view showing a configuration of a TFT substrate of an IPS mode LCD device according to a first exemplary embodiment of the present invention.

On the TFT substrate, as shown in FIG. 1, gate wirings 22 and data wirings 17 are disposed approximately at right angles to each other, and common electrode wirings 21 are disposed approximately parallel to the respective gate wirings 22. Moreover, in each of pixel regions surrounded by the gate wirings 22 and the data wirings 17, a TFT 20 is disposed, in which one of source and drain electrodes is connected to the data wiring 17. The other one of the source and drain electrodes of the TFT 20 is connected to a first pixel electrode 18 extending along the data wiring 17 within the pixel regions. The first pixel electrode 18 is bent in a portion of the common electrode wiring 21 and overlaps with the common electrode wiring 21 to form a storage capacitor electrode 19. Moreover, on both sides of each of the data wirings 17, a common electrode 15, which is connected to the common electrode wiring 21 through a first contact hole 23, and a second pixel electrode 16, which is connected to the first pixel electrode 18 through a second contact hole 24, are disposed.

Figure 2:
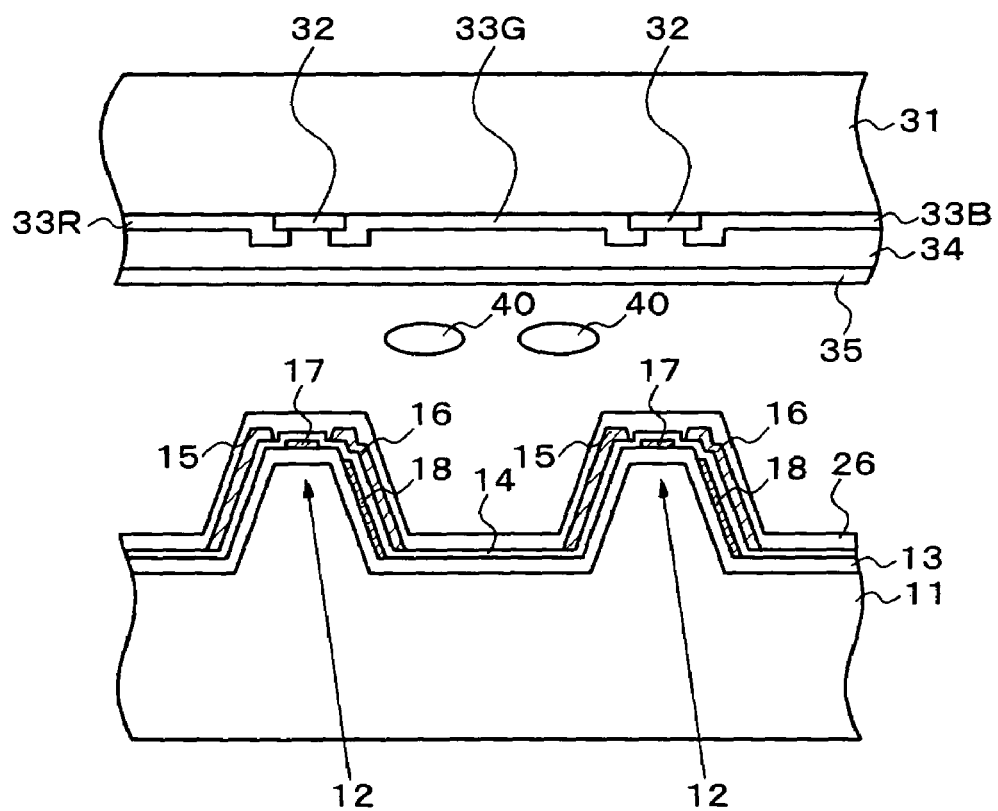
FIG. 2 is a view showing a structure of the TFT substrate of the IPS mode LCD device according to the first exemplary embodiment of the present invention, and is a cross-sectional view taken along the line I-I in FIG. 1.
Figure 3:
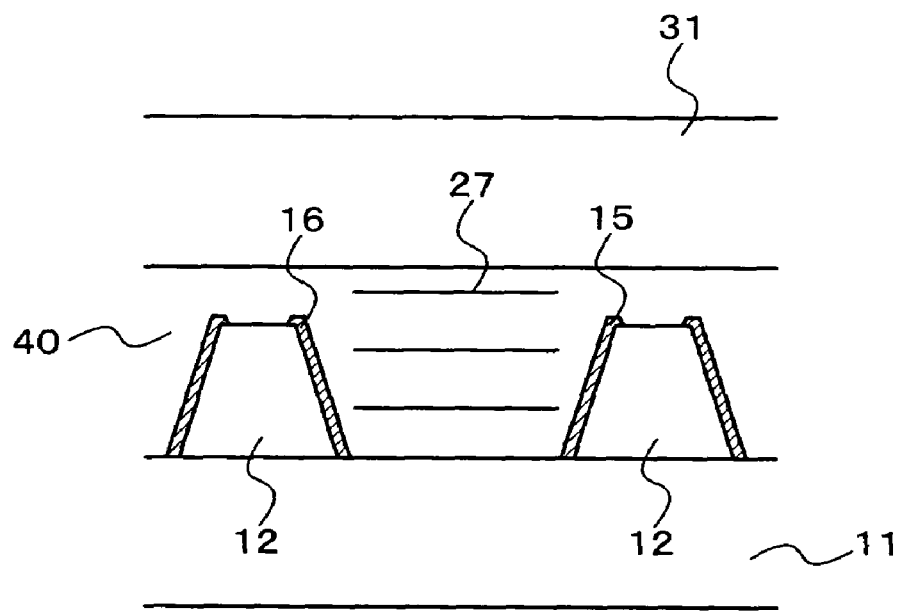
FIG. 3 is a view schematically showing an electric field generated in the IPS mode LCD device according to the first exemplary embodiment of the present invention.
Figure 4:
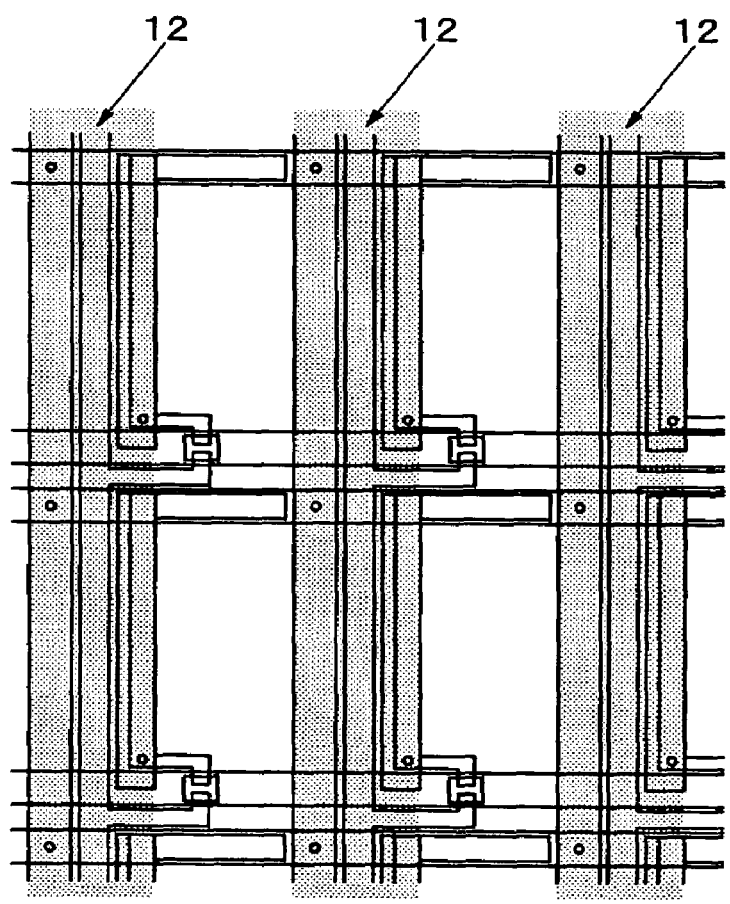
FIG. 4 is a plan view showing a configuration of convex parts on the TFT substrate of the IPS mode LCD device according to the first exemplary embodiment of the present invention.

Moreover, as shown in FIGS. 2 and 4, on a major surface of a glass substrate 11, convex parts 12 bulging along the data wirings 17 are formed. On an upper surface of each of the convex parts 12, the data wiring 17 is formed with a first insulating film 13 interposed therebetween. In a region including at least a part of one of side walls of the convex part 12, the first pixel electrode 18 is formed. Moreover, in a region including at least a part of the one side wall of the convex part 12, the second pixel electrode 16 is formed on the first pixel electrode 18 with a second insulating film 14 interposed therebetween. In a region including at least a part of the other side wall of the convex part 12, the common electrode 15 is formed. Specifically, as shown in FIG. 3, on the TFT substrate of this embodiment, the electrodes are disposed so as to allow the common electrode 15 to face the first and second pixel electrodes 18 and 16 across an aperture 25. Thus, it is possible to generate an electric field 27 which is uniform and approximately parallel to the substrate surface between the both electrodes. Furthermore, an alignment film 26 is formed on the common electrode 15, the second pixel electrode 16 and an exposed portion of the second insulating film 14.

Note that the configurations shown in FIGS. 1 and 2 are examples. As long as the common electrode 15 is formed on the one side wall of the convex part 12 and the second pixel electrode 16 is formed on the other side wall thereof, shapes and widths of the respective wirings and electrodes, positions of the contact holes and the like are not particularly limited. Moreover, in FIGS. 1 and 2, in order to make it easy to understand relationships among the data wirings 17, the common electrodes 15, the second pixel electrodes 16 and the first pixel electrodes 18 and the convex parts 12 are shown with emphasis. However, a width and a height of the convex part 12, tilt angles of the side walls thereof and the like are not limited. Moreover, in FIG. 2, a cross section of the convex part 12 has a trapezoidal shape. However, as long as the side walls are tilted at a predetermined angle relative to the major surface of the substrate, a rectangular shape, a polygonal shape, a shape having round corners or the like may be adopted.

As shown in FIG. 2, in the opposing substrate, black matrix layers 32, which define respective pixel regions and block light between the pixel regions, are formed on a glass substrate 31. In each of the pixel regions, a red color filter layer 33R, a green color filter layer 33G and a blue color filter layer 33B are formed. In addition, an overcoat layer 34 is formed, which covers the black matrix layers 32 and the color filter layers 33R, 33G and 33B and flattens a surface thereof. Moreover, on the overcoat layer 34, an alignment film 35 is formed. Furthermore, a liquid crystal layer 40 is interposed between the TFT substrate and the opposing substrate.

Next, with reference to FIGS. 1 and 2, description will be given of a method of manufacturing the active matrix LCD device of this embodiment.

Figure 5:
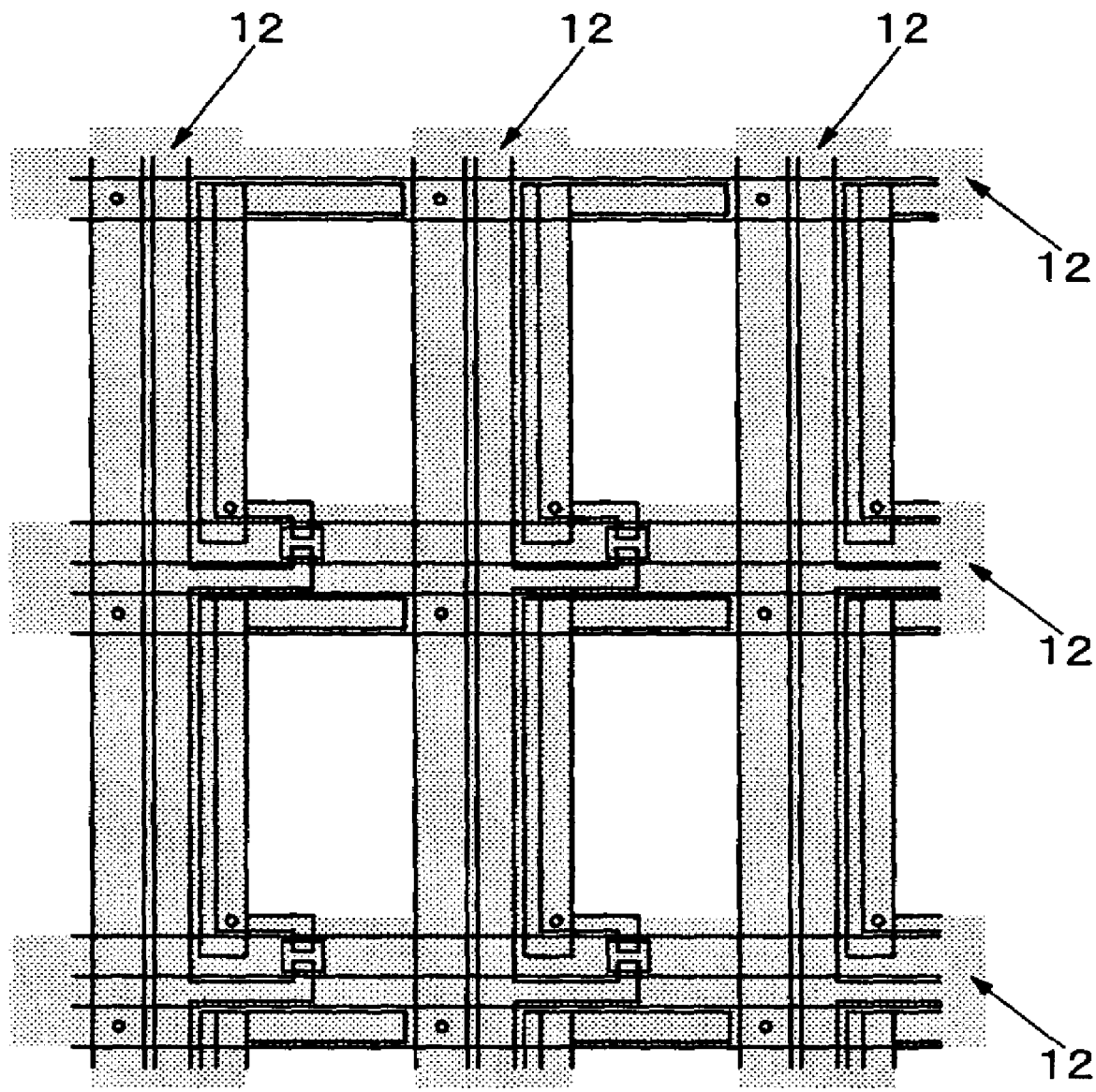
FIG. 5 is a plan view showing another configuration of convex parts on the TFT substrate of the IPS mode LCD device according to the first exemplary embodiment of the present invention.

First, on a glass substrate 11, a resist pattern is formed along a region where data wirings 17 are formed, by use of a well-known photolithography technique. Thereafter, by use of a well-known etching technique, the exposed glass substrate 11 is etched with a hydrofluoric acid etchant or the like. Thus, convex parts 12 as shown in FIG. 2 are formed. The convex parts 12 can be formed to have a desired shape by appropriately setting a region to form the resist pattern, an etching time, the type of the etchant and the like. Moreover, the convex parts 12 may be formed in a stripe pattern, as shown in FIG. 4, according to a pitch between the data wirings 17. Alternatively, as shown in FIG. 5, lattice-shaped convex parts may be formed by etching only portions to be apertures 25 without etching portions where common electrode wirings 21 and gate wirings 22 are disposed. Specifically, only the portions to be the apertures 25 may be formed to have a concave shape. Moreover, a height of the convex part 12 may be set equal to or smaller than a thickness of a liquid crystal layer in the aperture 25.

Next, a sputtering method is used to deposit Al, Mo and the like on the glass substrate 11 having the convex parts 12 formed thereon. Accordingly, by use of the photolithography and the etching techniques, the common electrode wirings 21 and the gate wirings 22 are formed.

Next, by use of a plasma-enhanced CVD method, a first insulating film 13 is laminated, which is made of a silicon oxide film, a silicon nitride film or the like. Subsequently, amorphous silicon, polycrystalline silicon or the like is deposited, followed by use of the photolithography and the etching techniques to form an island-shaped semiconductor layer to be a TFT 20.

Next, the sputtering method is used to deposit Cr and the like, and the data wirings 17, first pixel electrodes 18 and source and drain electrodes are formed by use of the photolithography and the etching techniques. By allowing the first pixel electrode 18 to overlap with the common electrode wiring 21 as shown in FIG. 1, it is possible to allow the first pixel electrode 18 to have a role to retain a voltage applied to the liquid crystal layer, as a storage capacitor electrode 19.

Thereafter, a second insulating film 14 made of a silicon oxide film, a silicon nitride film or the like is laminated by use of the plasma-enhanced CVD method. Subsequently, at predetermined positions on the common electrode wirings 21, first contact holes 23 are formed, which penetrate the first and second insulating films 13 and 14. At the same time, at predetermined positions on the first pixel electrodes 18, second contact holes 24 are formed, which penetrate the second insulating film 14.

Next, a transparent conductive layer such as ITO (indium thin oxide) is formed by use of the sputtering method. By use of the photolithography and the etching technique for the transparent conductive layer, common electrodes 15 and second pixel electrodes 16 are formed on both side walls of the convex parts 12 as shown in FIGS. 1 and 2. The common electrodes 15 are electrically connected to the common electrode wirings 21 through the first contact holes 23, respectively. The second pixel electrodes 16 are electrically connected to the first pixel electrodes 18 through the second contact holes 24, respectively. Here, the common electrodes 15 and the second pixel electrodes 16, which are formed on the both side walls, may be electrically insulated from each other. The electrodes described above may be formed so as to overlap with upper surfaces of the convex parts 12 or may be formed so as to partially cover the side walls.

Thereafter, an alignment film 26 is formed on the entire surface of the TFT substrate and a rubbing treatment is performed along with the initial alignment direction for the liquid crystal layer. In this event, in a TFT substrate of the related art, comb-teeth-shaped electrodes formed of pixel electrodes and common electrodes are formed in the apertures. Accordingly, rubbing dust is produced by differences in level formed by the comb-teeth-shaped electrodes and tend to remain in the apertures. Thus, inferior display characteristics such as a point defect may be caused by the rubbing dust. On the other hand, in the TFT substrate of this embodiment, no electrodes are formed in the apertures 25 of the pixel regions. Thus, no rubbing dust is produced in the apertures 25. Therefore, occurrence of the inferior display characteristics can be suppressed.

Meanwhile, in an opposing substrate, black matrix layers 32 for blocking light between pixel regions are formed. In addition, respective red, green and blue color filter layers 33R, 33G and 33B are formed. Moreover, an overcoat layer 34 is formed, which covers the black matrix layers 32 and the color filter layers 33R, 33G and 33B and flattens a surface thereof. Furthermore, an alignment film 35 is applied to the overcoat layer 34, and the rubbing treatment is similarly performed. Thereafter, by use of a vacuum injection method or an ODF (one drop fill) method, a liquid crystal material is introduced between the TFT substrate and the opposing substrate. By sticking the both substrates to each other at its bezel regions, the active matrix LCD device of this embodiment is completed, in which a liquid crystal layer 40 is interposed between the TFT substrate and the opposing substrate.

As described above, in the TFT substrate of this embodiment, the common electrodes 15, the second pixel electrodes 16 and the first pixel electrodes 18 are formed on the both side walls of the convex parts 12. Thus, effective areas of the electrodes can be increased while suppressing an increase in an occupied area in a planar direction on the substrate. In addition, it is no longer required to provide the comb-teeth-shaped electrodes in the apertures, unlike the TFT substrate of the related art. Accordingly, aperture ratio can be improved. Moreover, in the TFT substrate of this embodiment, the common electrodes 15 are disposed so as to face the second pixel electrodes 16 and the first pixel electrodes 18. Accordingly, an electric field, which is uniform and approximately parallel to the substrate surface, is generated between the both electrodes. Thus, viewing angle characteristics can also be improved. Moreover, in the TFT substrate of this embodiment, since there are no differences in level formed by the comb-teeth-shaped electrodes in the apertures 25, rubbing dust is less likely to be produced in the rubbing treatment. Thus, it is possible to suppress occurrence of inferior display characteristics such as a point defect caused by the rubbing dust.

Next, with reference to FIGS. 6 and 7, description will be given of an IPS mode active matrix LCD device according to a second exemplary embodiment of the present invention.

In the first exemplary embodiment described above, after the convex parts 12 are formed on the glass substrate 11, various wirings and electrodes are formed. However, by use of the method described above, it is required to form the gate wirings 22 and the common electrode wirings 21 so as to cross the convex parts 12. Moreover, it is required to form a resist pattern on the glass substrate 11 with irregularities. Thus, it is required to manufacture the device while giving due consideration to control abilities of the photolithography and the etching techniques. Accordingly, in this embodiment, provided is realization means for facilitating manufacturing by forming convex parts 12 immediately before common electrodes 15 and second pixel electrodes 16 are formed.

A planar shape of a TFT substrate of this embodiment is the same as that of the first exemplary embodiment. As shown in FIG. 6, gate wirings 22 and data wirings 17 are disposed approximately at right angles to each other, and common electrode wirings 21 are disposed approximately parallel to the respective gate wirings 22. Moreover, in each of pixel regions surrounded by the gate wirings 22 and the data wirings 17, a TFT 20 is disposed, in which one of source and drain electrodes is connected to the data wiring 17. The other one of the source and drain electrodes of the TFT 20 is connected to a first pixel electrode 18 extending along the data wiring 17 within the pixel region The first pixel electrode 18 is bent in a portion of the common electrode wiring 21 and overlaps with the common electrode wiring 21 to form a storage capacitor electrode 19. Moreover, on both sides of each of the data wirings 17, a common electrode 15, which is connected to the common electrode wiring 21 through a first contact hole 23, and a second pixel electrode 16, which is connected to the first pixel electrode 18 through a second contact hole 24, are disposed.

Figure 7:
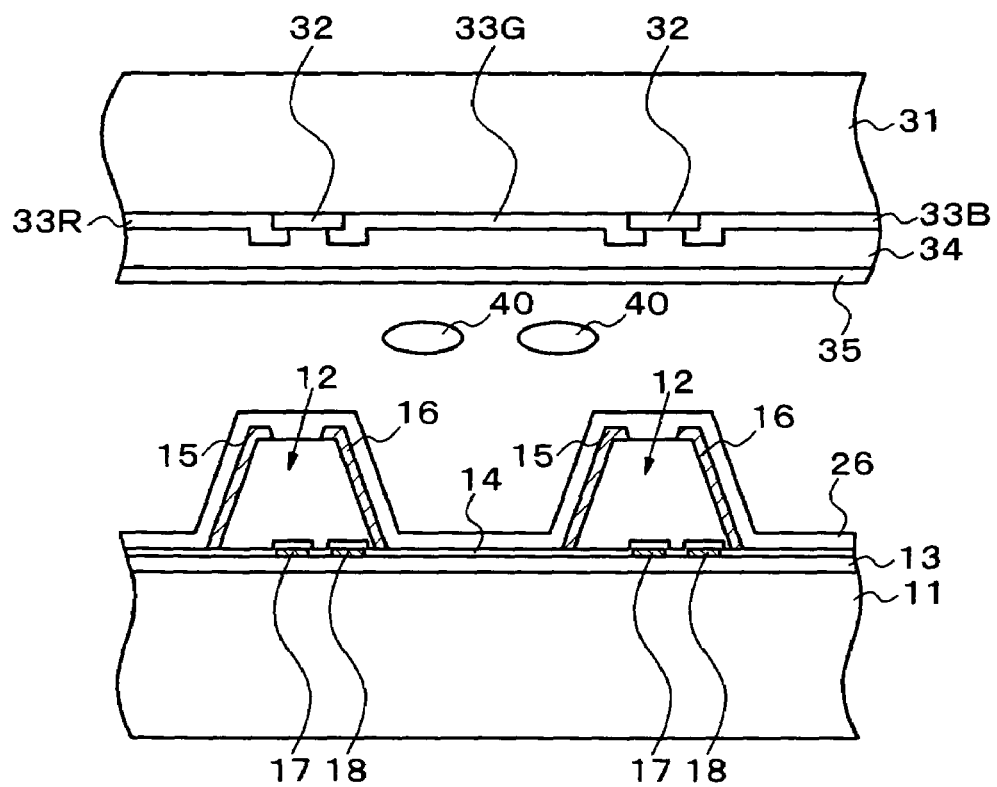
FIG. 7 is a view showing a structure of the TFT substrate of the IPS mode LCD device according to the second exemplary embodiment of the present invention, and is a cross-sectional view taken along the line II-II in FIG. 6.
Figure 8:
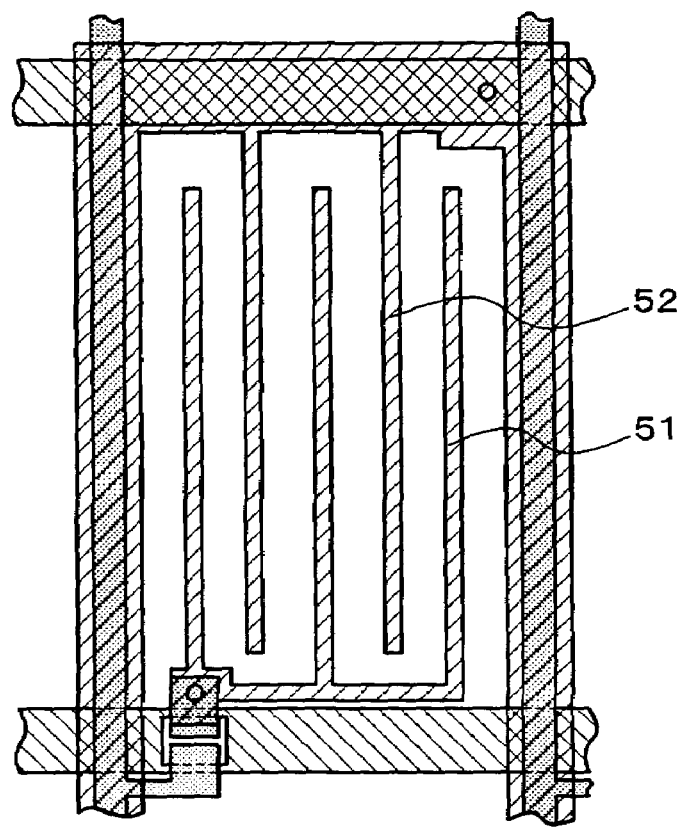
FIG. 8 is a plan view showing a configuration of a TFT substrate of an IPS mode LCD device of the related art.
Figure 9:
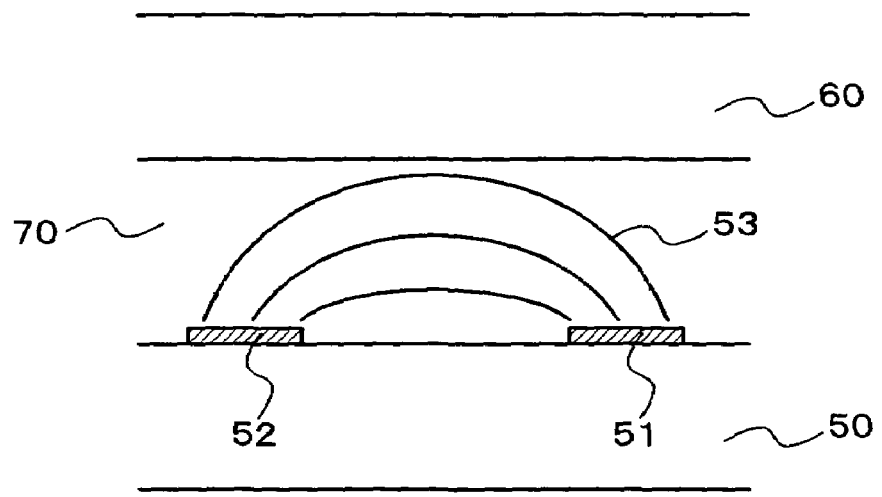
FIG. 9 is a view schematically showing an electric field generated in the IPS mode LCD device of the related art.

Moreover, as shown in FIG. 7, on a major surface of a glass substrate 11, the data wirings 17 and the first pixel electrodes 18 are formed with a first insulating film 13 interposed therebetween. On a second insulating film 14 on the data wirings 17, the first pixel electrodes 18, and the first insulating film 13, convex parts 12 bulging along the data wirings 17 are formed. In a region including at least a part of one of side walls of the convex part 12, the second pixel electrode 16 is formed. Moreover, in a region including at least a part of the other side wall of the convex part 12, the common electrode 15 is formed. Furthermore, an alignment film 26 is formed on the common electrodes 15, the second pixel electrodes 16 and the convex parts 12.

Figure 6:
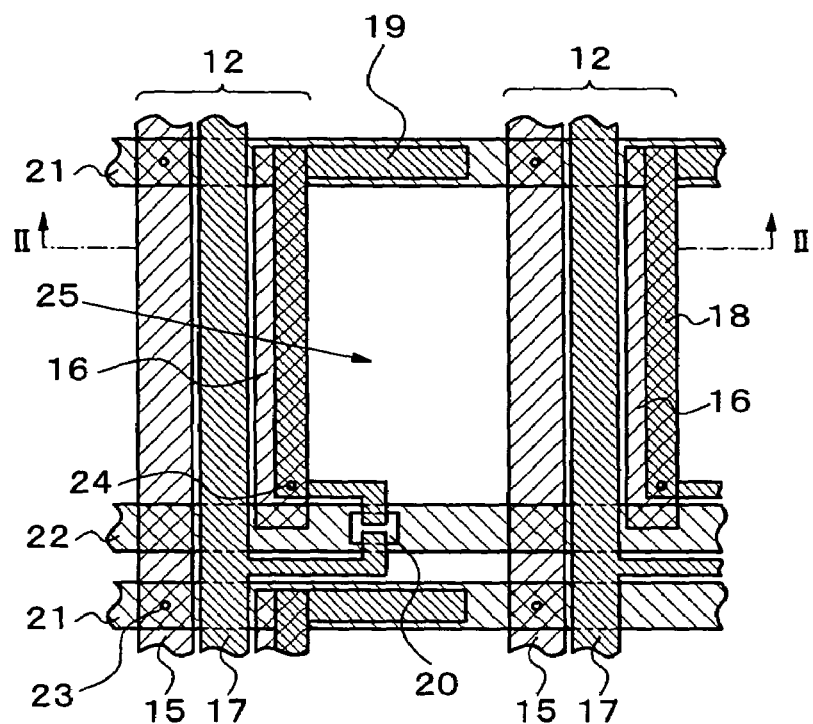
FIG. 6 is a plan view showing a configuration of a TFT substrate of an IPS mode LCD device according to a second exemplary embodiment of the present invention.

Note that the configurations shown in FIGS. 6 and 7 are examples. As in the case of the first exemplary embodiment, shapes and widths of the respective wirings and electrodes, positions of the contact holes and the like are not particularly limited. Moreover, in FIGS. 6 and 7, the convex parts 12 are shown with emphasis. However, a width and a height of the convex part 12, tilt angles of the side walls thereof and the like are not limited. Moreover, a cross section of the convex part 12 may have a shape in which side walls thereof are tilted with respect to the substrate surface.

As shown in FIG. 7, in an opposing substrate, black matrix layers 32, which define respective pixel regions and block light between the pixel regions, are formed on a glass substrate 31. In each of the pixel regions, a red color filter layer 33R, a green color filter layer 33G and a blue color filter layer 33B are formed. In addition, an overcoat layer 34 is formed, which covers the black matrix layers 32 and the color filter layers 33R, 33G and 33B and flattens a surface thereof. Moreover, on the overcoat layer 34, an alignment film 35 is formed. Furthermore, a liquid crystal layer 40 is interposed between the TFT substrate and the opposing substrate.

Next, with reference to FIGS. 6 and 7, description will be given of a method of manufacturing the active matrix LCD device of this embodiment.

First, a sputtering method is used to deposit Al, Mo and the like on a glass substrate 11, and common electrode wirings 21 and gate wirings 22 are formed by use of a photolithography technique and an etching technique.

Thereafter, by use of a plasma-enhanced CVD method, a first insulating film 13 is laminated, which is made of a silicon oxide film, a silicon nitride film or the like. Subsequently, amorphous silicon, polycrystalline silicon or the like is deposited, followed by use of the photolithography and the etching techniques to form an island-shaped semiconductor layer to be a TFT 20.

Next, the sputtering method is used to deposit Cr and the like, and data wirings 17, first pixel electrodes 18 and source and drain electrodes are formed by use of the photolithography and the etching techniques.

Next, after a second insulating film 14 made of a silicon oxide film, a silicon nitride film or the like is laminated by use of the plasma-enhanced CVD method, an insulating film such as polyimide to be convex parts 12 is formed to have a large thickness on the entire surface of the substrate. Subsequently, a resist pattern is formed on the data wirings 17 by use of a photolithography technique. The exposed insulating film is etched by use of the etching technique, and the convex parts 12 as shown in FIG. 7 are formed. Note that, also in this embodiment, the convex parts 12 can be formed to have a desired shape by appropriately setting a region where the resist pattern is formed, and etching conditions. Moreover, the convex parts 12 may be formed in a stripe pattern according to a pitch between the data wirings 17. Alternatively, lattice-shaped convex parts may be formed by etching only portions to be apertures 25. Furthermore, a height of the convex part 12 may be set equal to or smaller than a thickness of the liquid crystal layer in the aperture 25.

Subsequently, at predetermined positions on the common electrode wirings 21, first contact holes 23 are formed, which penetrate the first and second insulating films 13 and 14. At the same time, at predetermined positions on the first pixel electrodes 18, second contact holes 24 are formed, which penetrate the second insulating film 14.

Next, transparent conductive layer such as ITO is formed by use of the sputtering method. Thereafter, by use of the photolithography and the etching techniques for the transparent conductive layer, common electrodes 15 and second pixel electrodes 16 are formed on both side walls of the convex parts 12 as shown in FIGS. 6 and 7. The common electrodes 15 are electrically connected to the common electrode wirings 21 through the first contact holes 23, respectively. The second pixel electrodes 16 are electrically connected to the first pixel electrodes 18 through the second contact holes 24, respectively. Note that, as in the case of the first exemplary embodiment, the common electrodes 15 and the second pixel electrodes 16, which are formed on the both side walls, may be electrically insulated from each other. The electrodes described above may be formed so as to overlap with upper surfaces of the convex parts 12 or may be formed so as to partially cover the side walls.

Thereafter, an alignment film 26 is applied to the entire surface of the TFT substrate, and the rubbing treatment is performed. In this event, also in the TFT substrate of this embodiment, no electrodes are formed in the apertures 25. Thus, no rubbing dust is adhered in the apertures 25.

Meanwhile, in an opposing substrate, black matrix layers 32 for blocking light between pixel regions are formed. In addition, respective red, green and blue color filter layers 33R, 33G and 33B are formed. Moreover, an overcoat layer 34 is formed, which covers the black matrix layers 32 and the color filter layers 33R, 33G and 33B and flattens a surface thereof. Furthermore, an alignment film 35 is applied to the overcoat layer 34, and the rubbing treatment is similarly performed. Thereafter, by use of a vacuum injection method or an ODF (one drop fill) method, a liquid crystal material is introduced between the TFT substrate and the opposing substrate. By sticking the both substrates to each other at its bezel regions, the active matrix LCD device of this embodiment is completed, in which a liquid crystal layer 40 is interposed between the TFT substrate and the opposing substrate.

As described above, also in the TFT substrate of this embodiment, the common electrodes 15 and the second pixel electrodes 16 are formed on the both side walls of the convex parts 12. Thus, effective areas of the electrodes can be increased, and it is no longer required to provide the comb-teeth-shaped electrodes in the apertures 25, unlike the TFT substrate of the related art. Accordingly, aperture ratio can be improved. Moreover, in the TFT substrate of this embodiment, the common electrodes 15 and the second pixel electrodes 16 are disposed so as to face each other across the apertures 25. Accordingly, an electric field, which is uniform and approximately parallel to the substrate surface, is generated between the both electrodes. Thus, viewing angle characteristics can also be improved. Moreover, in the TFT substrate of this embodiment, since there are no differences in level formed by the comb-teeth-shaped electrodes in the apertures 25, rubbing dust is less likely to be produced in the rubbing treatment. Thus, it is possible to suppress occurrence of inferior display characteristics such as a point defect caused by the rubbing dust.

Note that, although the pixel region shown in FIGS. 1 and 6 takes a so-called single-domain structure, a multi-domain structure including bent apertures may be adopted in order to improve the viewing angle characteristics. In addition, although the glass substrate is used in the respective embodiments described above, a material of the substrate is not limited to glass as long as the substrate is a transparent substrate made of an insulator that can be an alternative for glass. Moreover, although the TFT is used as the switching element in the respective embodiments described above, other switching elements having equivalent functions may be used. Furthermore, in the embodiments described above, the structure of the present invention is applied to an inverted staggered type TFT. However, the present invention is not limited to the embodiments described above, but can also be applied to a forward staggered type TFT.

The present invention can be applied to IPS mode LCD devices in general. Particularly, in a high-definition IPS mode LCD device with a small pixel size, prominent effects can be achieved.

Although preferred embodiments of the invention has been described with reference to the drawings, it will be obvious to those skilled in the art that various changes or modifications may be made without departing from the true scope of the invention.

What is claimed is:

1. An in-plane switching mode liquid crystal display device, comprising:
   a pair of substrates facing each other; and
   a liquid crystal layer interposed between the pair of substrates,
   wherein one of the pair of substrates includes a plurality of gate wirings and a plurality of data wirings crossing each other, common electrode wirings disposed approximately parallel to the respective gate wirings, switching elements disposed in respective pixel regions surrounded by the gate wirings and the data wirings, and pixel electrodes connected to the switching elements,
   liquid crystal molecules of the liquid crystal layer within the pixel region are rotated in a plane approximately parallel to the substrate by a voltage applied between a common electrode connected to one of the common electrode wirings and the pixel electrode,
   stripe-shaped convex parts are formed so as to overlap at least with regions where the data wirings are formed,
   the pixel electrode is only formed in a region including at least a part of one side wall of the convex part, and does not cross over an aperture of the pixel region, and
   the common electrode is only formed in a region including at least a part of another side wall of the convex part, and does not cross over the aperture of the pixel region.

2. The in-plane switching mode liquid crystal display device according to claim 1,
   wherein the pixel electrode includes a first pixel electrode and a second pixel electrode, wherein the first pixel electrode is formed from a same layer from which the layer where the data wiring is formed, and the second pixel electrode is formed on the first pixel electrode with an insulating film interposed therebetween and is connected to the first pixel electrode through a contact hole, and wherein the second pixel electrodes and the common electrodes are formed from a same layer.

3. The in-plane switching mode liquid crystal display device according to claim 2, wherein the data wiring is formed on an upper portion of the convex part, and the first and second pixel electrodes are formed in a region including at least a part of the one side wall of the convex part.

4. The in-plane switching mode liquid crystal display device according to claim 2, wherein the data wiring and the first pixel electrode are formed under a lower portion of the convex part, and the second pixel electrode is formed in a region including at least a part of the one side wall of the convex part.

5. The in-plane switching mode liquid crystal display device according to claim 1, wherein a cross section of the convex part in a direction perpendicular to an extending direction has a trapezoidal shape in which side walls on both sides are tilted at approximately a same angle relative to a plane of the substrate.

6. An in-plane switching mode liquid crystal display device, comprising:

a pair of substrates facing each other; and a liquid crystal layer interposed between the pair of substrates, wherein one of the pair of substrates includes a plurality of gate wirings and a plurality of data wirings crossing each other, common electrode wirings disposed approximately parallel to the respective gate wirings, switching elements disposed, in respective pixel regions surrounded by the gate wirings and the data wirings, and pixel electrodes connected to the switching elements, liquid crystal molecules of the liquid crystal layer within the pixel region are rotated in a plane approximately parallel to the substrate by a voltage applied between a common electrode connected to one of the common electrode wirings and the pixel electrode, lattice-shaped convex parts are formed so as to overlap at least with regions where the data wirings, the gate wirings and the common electrode wirings are formed, the pixel electrode is only formed in a region including at least a part of one side wall of the convex part along the data wiring, and does not cross over an aperture of the pixel region, and the common electrode is formed iii a region including at least a part of another side wall of the convex part, and does not cross over the aperture of the pixel region.

7. The in-plane switching mode liquid crystal display device according to claim 6, wherein the pixel electrode includes a first pixel electrode and a second pixel electrode, wherein the first pixel electrode is formed, from a same layer as the layer from which the data wiring is formed and the second pixel electrode is formed on the first pixel electrode with an insulating film interposed therebetween and is connected to the first pixel electrode through a contact hole, and wherein the second pixel electrodes and the common electrodes are formed from a same layer.

8. The in-plane switching mode liquid crystal display device according to claim 7, wherein the data wiring is formed on an upper portion of the convex part, and the first and second pixel electrodes are formed in a region including at least a part of the one side wall of the convex part.

9. The in-plane switching mode liquid crystal display device according to claim 7, wherein the data wiring and the first pixel electrode are formed under a lower portion of the convex part and the second pixel electrode is formed in a region including at least a part of the one side wall of the convex part.

10. The in-plane switching mode liquid crystal display device according to claim 6, wherein a cross section of the convex part in a direction perpendicular to an extending direction has a trapezoidal shape in which side walls on both sides are tilted at approximately a same angle relative to a plane of the substrate.

* * * * *